United States Patent [19]

Snow

[11] Patent Number: 4,702,131
[45] Date of Patent: Oct. 27, 1987

[54] HAND DRIVEN PRECISION TAPPING SYSTEM

[76] Inventor: Harold Snow, Holiday Dr., Shaftsbury, Vt. 05262

[21] Appl. No.: 747,771

[22] Filed: Jun. 24, 1985

[51] Int. Cl.$^4$ .......................... B23B 43/00; B23G 5/06
[52] U.S. Cl. ................. 81/177.5; 408/239 R; 408/241 R
[58] Field of Search .............. 408/238, 239 R, 239 A, 408/241 R, 241 B, 72 B, 119 B, 72 R, 119 R, 126, 139, 140; 81/177.1, 177.5, 177.85; 10/129 R, 129 M

[56] References Cited

U.S. PATENT DOCUMENTS

| | | | |
|---|---|---|---|
| 2,465,152 | 3/1949 | Ellison | 81/177.5 |
| 2,465,541 | 3/1949 | Kreshock | 10/147 |
| 2,729,128 | 1/1956 | Gilbert | 408/239 R |
| 2,985,899 | 5/1961 | Elliott | 408/239 R |
| 3,174,168 | 3/1965 | Jones | 408/239 |
| 3,364,510 | 1/1968 | Johnson | 10/150 |
| 3,653,780 | 4/1972 | Ammatuna | 408/241 |
| 4,096,896 | 6/1978 | Engel | 81/177.85 |
| 4,274,774 | 6/1981 | Haga et al. | 408/239 R |

FOREIGN PATENT DOCUMENTS

| | | | |
|---|---|---|---|
| 1090416 | 3/1955 | France | 408/238 |
| WO/4209 | 12/1982 | PCT Int'l Appl. | 408/239 R |

*Primary Examiner*—Z. R. Bilinsky
*Attorney, Agent, or Firm*—Schmeiser, Morelle & Watts

[57] ABSTRACT

A precision hand-driven tapping system for use with an inert rotating-spindle machine which is employed for stability and guidance, comprising a wrench body, guide means and non-integral tap adapter and is secured within said machine by its chuck, collett or clamping device. The wrench body has thereon, and out of the tap line-of-sight, handles spaced 120° apart, or a wheel-like device, for applying hand force to rotate the body. A series of tap-holding adapters are used to secure various sized taps by their shanks. Adapters are press-fitted into the wrench body. A machine clamping device holds the system guide means which, in turn, allows the adapter and tap holding body of the wrench to be manually advanced toward a work piece, manually operated to tap it, and to subsequently be retracted and removably secured at the machine clamping device without the machinist removing his or her hands from the wrench.

4 Claims, 4 Drawing Figures

HAND DRIVEN PRECISION TAPPING SYSTEM

BACKGROUND AND OBJECTS OF THE INVENTION

This invention relates generally to a tapping system and more particularly to a tapping system for use with a rotating-spindle machine.

Throughout this work, terms "coaxial" and "coaxiality" shall be used to refer to tools, devices and various geometries which share the same centerline or major axis. In the drawings, this characteristic will be portrayed as alignment on a centerline or, if viewed from above, as essentially concentric geometries, i.e., sharing an identical center.

For years, machinists have threaded holes by initially boring or drilling the desired chamber and then inserting and either machine or manually rotating a thread-cutting tap into the chamber. This basic method, though simple, has definite shortcomings in the age of precision machining.

First, machine driven tapping usually produces a rougher thread than does manual or hand tapping. This is caused by the tendency of the very hard steel of the tap to burnish the surface or thread faces of the material being worked. Conversely, hand tapping generally produces a much cleaner and smoother thread because the machinist progresses slowly, reverses the tapping motion and is literally able to "feel" his way through the work.

Another shortcoming of the basic method, and a disadvantage of its manual aspect, is that true coaxial alignment of the thread axis with that of the desired bore is rarely obtained. Needless to say, if true precision tapping is to be achieved, coaxial misalignment must be eliminated. An idealized tapping system would embody the sensitized human skill with the precision of an accurate, stable machine. I feel that I have achieved these highly desirable characteristics in this hand tapping system while, at the same time, I have defeated other onerous or precision-destroying facets of the aforementioned basic tapping methods.

It is therefore an object of the present invention to minimize the time normally consumed in moving from a drilling operation to a tapping one.

Another object of this invention is to make the manual tapping operation easier by eliminating any requirement for hand(s) removal from the tap wrench, while giving the machinist a sure and more comfortable grip with a clear line-of-sight to the tap and work piece.

Another object of this invention is to provide a simple, sound means of inserting and securing a tap into the wrench without the use of other tools and while avoiding the coaxial misalignment mentioned earlier. In addition to being easily insertable, there should be a corresponding ease of removal.

Another object of this invention is to coaxially align the tap, with the bore or hole to be threaded, with utmost precision.

Another object of this invention is to provide means for moving the tap away from the work piece and temporarily securing it in a ready-to-use position in order to facilitate movement of the work piece and immediate reuse of the tap.

Another object of this invention is to provide an inherently safe design so that, should the spindle machine inadvertently be turned on, the invention will not become an additional hazard.

A further object of this invention is to provide a manual tapping system which is usable with a stable shaft, hollow or solid, which has affixed to it a clamping means such as a chuck or collett. Such shafts would include, but are not necessarily limited to the spindles of drill presses, vertical millers, lathes, and the like.

Objects and advantages of this invention are set forth herein but by no means circumscribe the breadth of the invention nor the concepts and applications derivable from the disclosed principles. Practice with this invention will make the stated advantages clear while one versed in the machinist or tool design art may infer the more subtle by referring to the Summary, Drawing Descriptions, Preferred Embodiments and Claims as hereinafter described.

SUMMARY OF THE INVENTION

The objects of this invention may be realized by the use of a hand-tapping system which utilizes a special wrench with integral guiding means as well as a means for rapid insertion and removal of taps or other cutting tools.

The wrench is basically a rigid body, having a hole or chamber at the base in which is inserted a snug-fitting tap adapter. On the vertical center line, top portion of the wrench, is a tapped hole which is countersunk. There is attached to the body a means for hand rotating the body about its vertical center line, such means being placed out of the operator's line-of-sight to the cutting tool. Illustratively, this invention embodies the latter means by emplacing three spokes about the periphery of the wrench body inclined at an angle of 10° to 30° (ideally 20°) above the plane of rotation. It is conceivable that this inclination (of the spokes) could be below the horizontal plane of rotation, i.e., a depression of 10° to 30°. This would undoubtedly be done in order to exert more hand force. However, line-of-sight to the tool and work piece might be obscured. The spokes are fitted with ball knobs to ensure easy and positive gripping. Alternatively, the gripping means could be a wheel which would ensure means for the operator to maintain continuous hands-on manipulation of the wrench without ever obscuring sight of the cutting tool and work piece by either body parts or wrench parts.

Guiding means comprises a threaded guide bolt inserted into the tapped countersunk hole of the wrench and has thereon a close fitted bushing. The lower flange of the bushing may be press-fitted into the top circumferential groove which is created between the inserted guide bolt surface and the inner surface of the existing top countersunk. The non-threaded end of the guide bolt is flanged or fitted with means to preclude removal of the bushing. When inserted for use, the bushing is press-fitted into the groove, thus becoming fixed relative to the wrench body. The entire unit (possibly devoid of cutting tool) is set into the chuck, collet or retaining ring of a lathe, vertical miller, jig bore, drill press (or other machine having a rotating spindle output) and gripped on the outer surface of the bushing.

Thus, the wrench is secured to the bushing which is in turn retained in a spindle, chuck, collet or similar retainer and the guide bolt is received into the retainer and via the bushing, capable of extension and rigid guidance therefrom.

Means for rapid cutting tool insertion into and removal from the wrench body is afforded by an adapter.

The adapter is closely machined and press-fittable into the base of the body, its center line coaxially aligned with that of the wrench body. The adapter may be precision fitted with a variety of cutting tools.

The foregoing general description and the following detailed description are exemplary and explanatory but are not restrictive thereof.

The accompanying drawings, referred to herein and constituted a part hereof illustrate preferred embodiments of the invention and, together with the description, serve to explain the principles of the invention but are not to be construed as restrictive thereof.

DESCRIPTION OF THE PREFERRED EMBODIMENT

Referring now more particularly to FIGS. 1 through 4 of the accompanying drawings, there is illustrated the prototypical or conventional embodiment for employing this systematic tapping concept.

Figure 1:
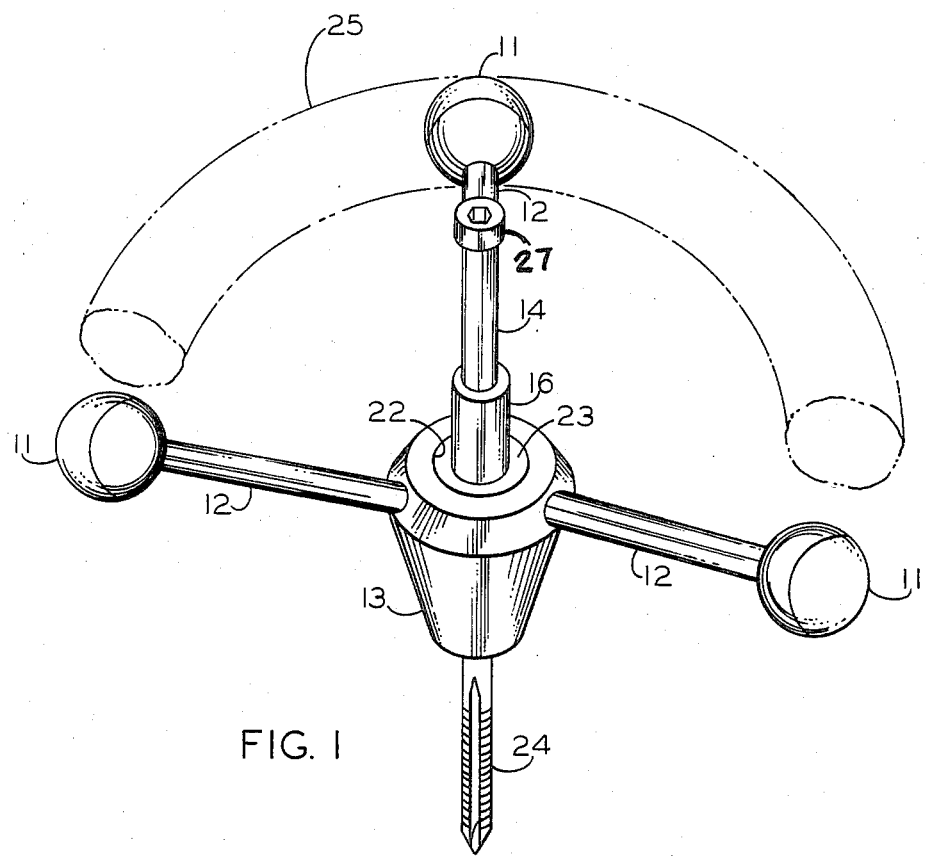
FIG. 1 is a perspective view showing guide means with seated bushings, three spokes with ball knobs, and tap inserted.

In FIG. 1, the body 13 is essentially an inverted conically-shaped mass, truncated at the vertex and chamfered at the base edge. The chamfering is performed in order to receive spokes 12 perpendicular to the surface, thus resulting in their inclination to the horizontal or rotational plane. In this embodiment, ball knobs 11 are placed at the other end of the spokes with an optional wheel 25 depicted in phantom. The guide means, comprised of the bolt 14 with integral flange 27, is threadably 26 inserted into the top of the wrench body 13 and the bushing 16, which is slideably mounted thereon, is seated in the top of the wrench body coaxially mounted in a countersunk bore 22. The bushing flange 21 is inserted into the groove 23 formed by the bolt outer diameter and the inner surface of the countersink 22. A tap 24 is inserted at the base of the body.

Figure 2:
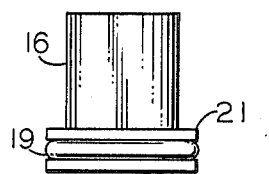
FIG. 2 is an elevational view of the bushing with O-ring inserted in a wider diameter base.

FIG. 2 depicts a bushing 16 which has a larger diameter base flange 21 for receiving an O-ring 19. When the bushing is press-fitted into the top of the wrench body 13, the O-ring provides the necessary friction to hold the body immobile with reference to the bushing. When the entire assembly is inserted into the chuck, collet or receiving ring of a rotary spindle machine, clamping is made on the exposed surface of the bushing. The O-ring is composed of a flexible, resilient material which has a high coefficient of friction.

Figure 3:
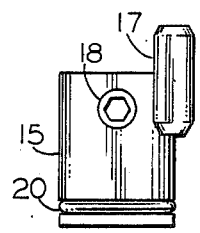
FIG. 3 is an elevational view of the tap/cutting tool adapter illustrating a possible drive pin placement with set screw and O-ring inserted in base.

A preferred embodiment of the adapter 15 is depicted in FIG. 3. In this case, the adapter 15 is comprised of a rigid mass of material which has been machined, by drilling or boring, to receive the shank of a tap or cutting tool. Means are provided to secure the cutting tool within the body of the adapter; here, two set screws 18, placed 180° apart, are provided. Since the adapter is cylindrically shaped and would presumably slip within the wrench's body chamber as the wrench is driven, means have been provided to assure that the adapter precisely follows any rotational motion of the wrench. The means depicted in FIG. 3 consists of a groove 23 hollowed into the upper portion of the adapter into which is eventually inserted a drive pin 17. It is seen that a key within the body chamber and corresponding key way cut into the exterior surface of the adapter may also be used to drive the adapter with the wrench. Since the adapter, like the bushing 16, is to be press-fitted into its receiving chamber 15' (not shown) means have also been provided to secure the adapter, but in an easily removable fashion. As with the bushing, a resilient flexible O-ring 20 comprised of a material such as fiber, rubber or neoprene is used to provide the necessary friction which would guarantee retention of the adapter within the wrench body.

Figure 4:
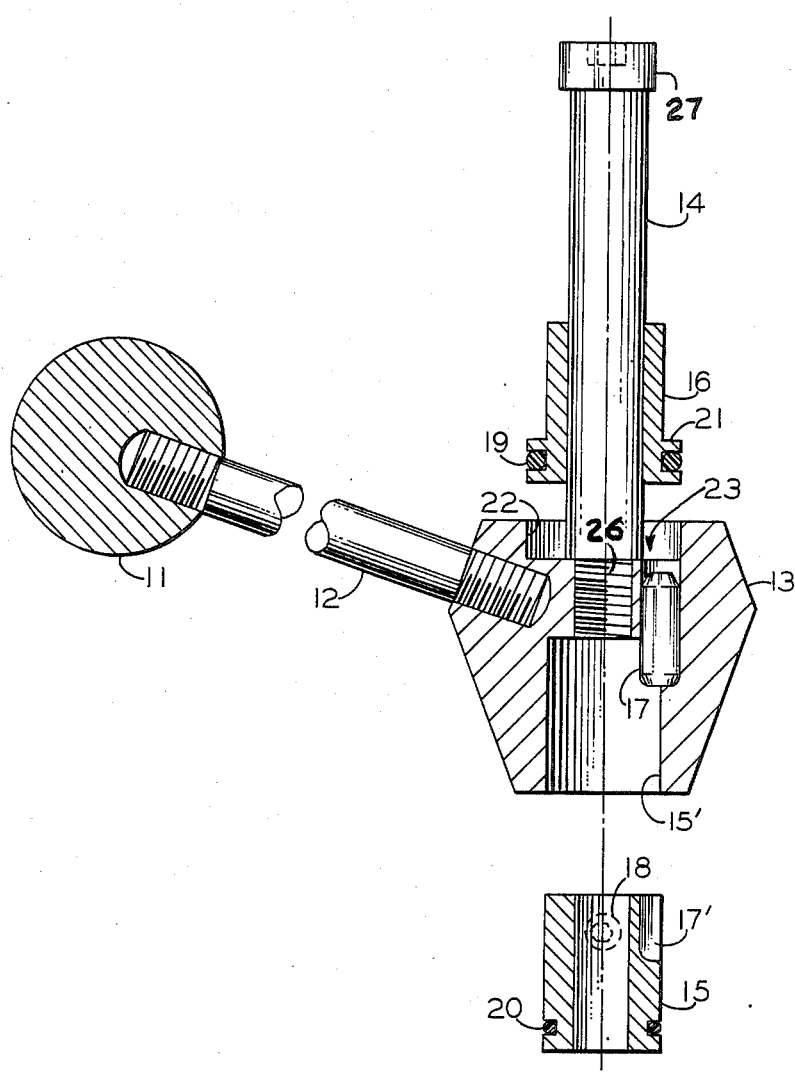
FIG. 4 is a sectional, partial view illustrating major components of the system.

Referring now more particularly to FIG. 4 of the accompanying drawings, there is illustrated a specific embodiment of the invention in partial, cross-sectional view. The major parts—the guide bolt 14, the body 13, and the adapter 15—are shown aligned in their proper positions for operation. The guide bolt 14 is threadably 26 inserted into the wrench body 13 and the bushing 16 is in position preparatory to insertion into the groove in the top of the wrench body. The wrench body has been chamferred at the top edge and the spokes 12 have been inserted perpendicular to the surface of the chamferred face. As can be seen from this illustration, mounting the handles perpendicular to a chamferred surface of 20° will insure that the drive means are inclined a corresponding number of degees above the rotational plane. A drive pin 17 has been positioned within the wrench body and protrudes into the chamber 15' which receives the adapter 15. The groove or key way, which would be fitted over the key or pin 17', is depicted on the cross sectional view of the adapter 15. It is also obvious that means other than those provided may be used to drive the adapter within the wrench body. For example, the adapter and the chamber within the wrench body for receiving the adapter could have been of a geometric shape which would ensure adapter immobility once it is inserted. It is considered possible to provide an adapter and receiving chamber basically shaped in the form of a hexagon. It would be expedient because such adapters could be fabricated from ordinary bar stock.

Before describing the employment of this tapping system, it is necessary to address the type of machines in which it generally serves as an accessory. That class of machines having output means taken along the axis of a rotating spindle has several characteristics which are noteworthy and make it especially suitable for work with this tapping system. The characteristics of interest are: a spindle, precise in its alignment, and having means of holding this tapping system; a table or platform that can hold a work piece securely and move in a plane perpendicular to or oblique to the spindle axis; and a measuring system which will record table or platform movement with great precision.

Thus, by taking advantage of these characteristics, holes may be drilled in a work piece in a multitude of recorded locations, and the work piece then maneuvered, returned to indexed positions and holes then tapped in the precise locations in which they were formerly drilled.

It is important to note that this tapping system is not driven by the aforementioned machine. Rather, it is a hand-operated tool system merely supported by the machine spindle which should be locked from turning while the tapping tool is attached. To reiterate, the machine, in actuality an adjunct to the tapping system, merely provides precise, accurate alignment and a secure retention of the tapping system in that alignment.

In operation, the spindle of the (adjunct) machine is locked so that it may not rotate and power is removed from the machine; the tapping system, absent the adapter 15 and tool 24, is set into the configuration depicted in FIG. 4, and the bushing 16 is press-fitted into the countersink groove 22 or receiving means in the top of the wrench body 13; the wrench assembly is placed into the collett of a rotating spindle machine, say a vertical miller; one of several tap or cutting tool-bearing adapters is then selected and press-fitted into the receiving chamber 15' in the bottom of the wrench; the work piece is maneuvered directly under the center line of the vertical spindle (in this case); and the machinist prepares to perform the required cutting or tapping work.

The machinist has only to apply a slight rotational motion on one of the handles 11, 12 or along the optional wheel 26 (depicted in phantom) of the wrench and the frictional constraint of the bushing O-ring 19 will be broken. The wrench body will slide down from the interior of the collet, its guide shaft riding in the bushing 16 which is securely held by the collet. Once the tap enters the work piece, the machinist may then begin manipulation, that is, rotational movement or cutting action into the work piece, reversing his rotational motion when desired. When the cutting is completed, or at any time the machinist desires to quit the work and withdraw the tool, the wrench body may be raised and secured once again to the exposed flange 21 and O-ring 19 of the bushing 16. At any time subsequent to the foregoing action, the adapter 15 may be readily removed by gripping the exposed portion of the cutting tool 24 and pulling downward. Another tool bearing adapter may then be inserted into the wrench, and work resumed.

It is readily apparent that, in addition to the ease with which this tapping system may be used, there is also inherent a distinct safety advantage over other machine held tools. If the adjunct machine, that is, the rotating spindle alignment device, were to be turned on, the inertia of the resting wrench body with its mass augmented by the handling means mass would apply enough counter rotational force so as to break away from the frictional constraint of the bushing O-ring 19. Thus, the wrench apparatus would become disengaged from the bushing and, as the guide bolt spins, remain relatively stationary presenting no overt hazard to the operator or machinist. If alternative handling means were provided, such as a wheel device 25 in place of the knobs 11, the inherent safety factor would then be enhanced because even if the wrench were not to break away immediately from the constraining O-ring effect, a slight touch on the wheel would ensure such with no danger of the operator being struck by a rotating knob.

It may thus be seen that all of the objectives of this invention have been met with the embodiments described herein. The invention in its broader aspects is not limited to the specific embodiment herein shown and described, but departures may be made therefrom within the scope of the following claims, without departing from the principles of the invention nor the objectives thereto, and without sacrificing any of the described advantages.

I claim:

1. A hand-driven tap wrench comprising: a body having essentially a flat top and base, said base having therein a chamber for receiving a tool securing means that is adapted to hold a cutting tool, said top having a countersunk threaded hole for receiving a threaded cylindrical shaft of smaller diameter than the countersink so as to create a groove between said countersink and the threadably inserted shaft;

handling means rigidly secured to the body and elevated relative to the point of securement, said means used to hand drive the body in a rotational rotation about said cylindrical thread shaft; and guide means for allowing the body to be advanced towards a work piece, being retained in proper alignment by a tool holder of a rotating machine, and to be thereafter retracted from the work piece and removably secured to said holder, said guide means comprising said cylindrical shaft one end of which is threadably attached to the body and the other end is provided with a flange, a slidable, cylindrical bushing having a top and a base flange bearing an O-ring about the base flange outer surface, said bushing being mounted on said shaft cylindrical so that its base flange may be press-fitted into said groove and prevented from sliding off said shaft by the shaft flange, whereby when said bushing is clamped in the tool holder of a rotating machine, the body may be slidably advanced towards a work piece until the top of said bushing contacts the shaft flange and, upon retraction from the work piece, the body bearing the shaft in its top may be guided towards said holder until the bushing's base flange is press-fitted into the body's groove and the body is thereafter secured to the bushing by the frictional restraint of said O-ring.

2. The invention of claim 1 wherein said bushing is of a larger outer diameter than said shaft flange so that a collet may clamp its surface uninhibited by said shaft flange.

3. The invention of claim 1 wherein said handling means further comprises a plurality of spokes radiating outwardly and upwardly from their points of attachment to said body and terminating in a wheel which circumferentially connects all spokes and is in concentric registry with said body held in a spaced relationship from said body by said spokes.

4. The invention of claim 1 wherein said O-ring further comprises a resilient, flexible O-ring.

* * * * *